(No Model.)

W. G. KETCHUM.
PULVERIZING ATTACHMENT FOR PLOWS.

No. 357,607. Patented Feb. 15, 1887.

Witnesses:
W. K. Rowe,
H. M. Richards

Inventor:
Wm. G. Ketchum,
By W. B. Richards,
Atty.

N. PETERS, Photo-Lithographer, Washington, D. C.

UNITED STATES PATENT OFFICE.

WILLIAM G. KETCHUM, OF AUGUSTA, ILLINOIS, ASSIGNOR OF ONE-HALF TO BENJAMIN B. CRAIN AND HARRY D. WILLIAMSON, BOTH OF SAME PLACE.

PULVERIZING ATTACHMENT FOR PLOWS.

SPECIFICATION forming part of Letters Patent No. 357,607, dated February 15, 1887.

Application filed November 30, 1886. Serial No. 220,239. (No model.)

*To all whom it may concern:*

Be it known that I, WILLIAM G. KETCHUM, a citizen of the United States, residing at Augusta, in the county of Hancock and State of Illinois, have invented certain new and useful Improvements in Pulverizing Attachments for Plows, of which the following is a specification.

My invention relates to novel attachments to the mold-boards of plows for pulverizing the furrow-slice as it is turned over by the mold-board; and the improvement consists, essentially, in a blade or a series of blades adjustably secured to the outer surface or face of the mold-board or plowshare to project outwardly and rearwardly from the face thereof in such manner as to divide the furrow-slice into any requisite number of strips sufficiently narrow to disintegrate or crumble as they are turned over, The improvement further consists in providing suitable means for attaching and adjusting the blade or blades upon the plow, in providing a double-edged reversible blade adapted to various conditions of soil, and in certain details of construction hereinafter more fully described, and specifically designated in the claims.

Figure 1:
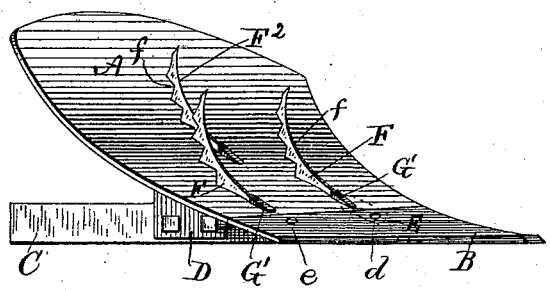
Figure 2:
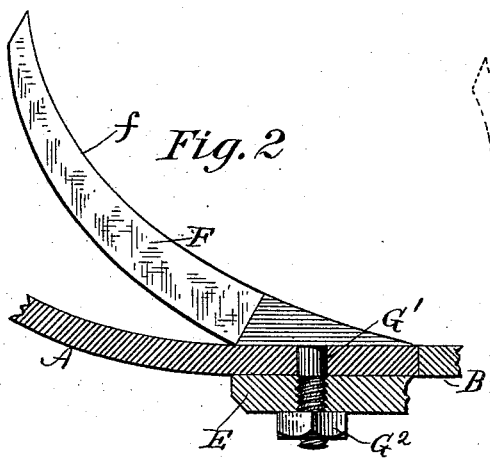
Figure 3:
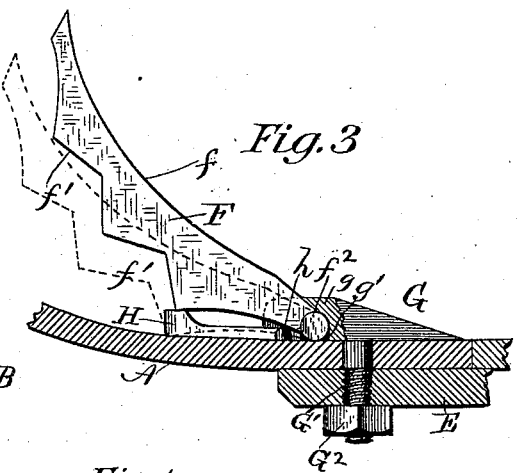
Figure 4:
Figure 5:
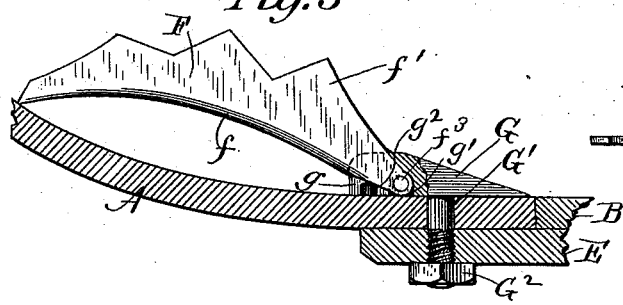
Figure 6:
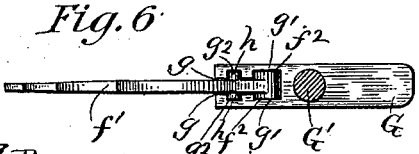

In the accompanying drawings, Figure 1 is a side elevation of part of a plow with a series of my improved blades or attachments secured thereto; Fig. 2, a side elevation of a blade or attachment having means formed integral with the blade for securing it to the mold-board, and with a fragment of the mold-board and joint-plate shown in section; Fig. 3, a side elevation of an adjustable and reversible blade, (shown by full lines in one position, and by dot-lines in a second position,) secured in a peculiar manner to the mold-board, fragments of the latter and of the joint-plate being shown in section; Fig. 4, a plan of the adjusting-block for holding the blade out from the mold-board, as shown by full lines in Fig. 3; Fig. 5, a side elevation of the blade, bolt-block, and bolt, with the bolt-block partly in section, the mold-board and joint-plate in section, and the blade shown with its serrated edge turned outwardly; Fig. 6, a plan of the under side of the blade and bolt-block, with the bolt in section and the adjusting-block shown in Figs. 3 and 4 removed.

My improvements may be applied to plows of various forms, a well-known style or form being shown in Fig. 1, wherein a mold-board, A, share B, and landside C are united by a frog, D, joint-plates E, and bolts $d\, e$, in a well-known manner.

A cimeter-shaped blade, F, preferably of steel, having a smooth concave sharpened edge, $f$, and a serrated convex edge, $f'$, is pivotally secured to a bolt-block, G, as shown in Figs. 1, 3, 5, and 6. The bolt-block G is preferably formed integral with a bolt, G', which passes through the mold-board A and joint-plate E, and, together with the nut $G^2$, may serve the double purpose of holding the blade upon the plow and securing the mold-board to the joint-plate and share. The bolt-block G is wedge-shaped at its forward end, to permit the furrow-slice to run freely over it, and is slotted at $g$ and formed with sockets $g'$ to receive cylindrical lugs $f^2$ upon the pivoted end of the blade F, and permit the blade to swing a limited distance toward or away from the mold-board. By removing the nut $G^2$ the bolt-block G may be removed, and the blade F may then be readily removed from the socket in the bolt-block and reversed, as shown in Figs. 3 and 5, to present either a smooth cutting concave edge or a serrated convex edge to the furrow-slice, as may be required. When the soil freely disintegrates, the smooth cutting-edge is presented to the furrow-slice, and when it is hard and requires rougher treatment the serrated edge is turned outwardly. The bolt-block G is also formed with sockets $g^2$ at the rear inner end of the slot $g$, to receive half-round lugs $h$ upon the forward end of the adjusting-block H. (Shown in elevation in Fig. 3, and in plan at Fig. 4.) When the adjusting-block is in position upon the bolt-block, it will hold the blade away from the mold-board, as shown by full lines in Fig. 3, and when it is removed, as may be easily done by releasing the nut $G^2$, the blade F will lie closer to the mold-board, as shown by dot-lines in Fig. 3. By the use of these adjusting-blocks H the blades F may be made to cut through thicker furrow-slices than without them, and adjusting-blocks of different thicknesses may be used, as required.

The blade F may be pivoted to the bolt-block G by a rivet, $f^3$, as shown in Fig. 5 of the drawings, instead of by the lugs and sockets shown in Figs. 3 and 4, hereinbefore described; and, if preferred, the blade F and bolt-block G may be securely united to be non-adjustable and non-reversible, as shown in Fig. 2. The blade may also be smooth on both sides, as shown at same figure, if preferred.

Any number of blades may be employed, three of which are shown in Fig. 1, secured at triangularly-located points upon the mold-board, which serve to divide the furrow-slice into four strips as it passes over the mold-board. Two of the blades are held in position by bolts G', which also hold the mold-board A and joint-plate E together, and the third blade, F², is held by a shorter bolt passing through the middle portion of the mold-board.

The blades F may be made to adjust themselves accurately to the movement of the furrow-slice upon the mold-board by slightly loosening the nuts G², which will permit the blades to swing freely into line by the pressure of the earth upon them when the plow is operated, and when the adjustment is thus effected the nuts G² can be tightly screwed upon their bolts to hold the blade firmly in position upon the mold-board. The furrow-slice will, by the above-described means, be cut up and completely pulverized without diverting or retarding the free movement of the soil upon the mold-board.

I claim as my invention and desire to secure by Letters Patent—

1. The combination, with the plow, of the blade projecting from and across the face of the mold-board and adjustable to incline it at different angles toward and from said face, substantially as described.

2. A pulverizing-blade for plows, having a smooth edge upon one side, a serrated edge upon the opposite side, and means for attaching it to the mold-board or share to present either edge forward, substantially as described.

3. The combination, with a plow, of a bolt-block, G, having a socket, $g'$, and an adjustable blade, F, having lugs $f^2$ to fit said socket, substantially as described.

4. The combination, with a plow, of the adjustable blade F, the bolt-block G, and an adjusting-block, H, removably secured to said bolt-block, substantially as described.

5. The combination, with a plow, of the adjustable-blade F, the bolt-block G, having bearing-sockets $g^2$, and an adjusting-block, H, having lugs $h$ to fit said sockets, substantially as described.

6. The combination, with a plow, of a bolt-block, G, having bearing-sockets $g'\ g^2$, a blade, F, having lugs $f^2$, and an adjusting-block, H, having lugs $h$ to fit said sockets, substantially as described.

7. In combination, in a plow, a bolt-block which is provided with means for securing it to the mold-board or share, and a pulverizing-blade pivotally connected with said bolt-block, whereby it may be adjusted by any suitable means to project at different inclinations to or from the face of the mold-board, substantially as and for the purpose specified.

In testimony whereof I affix my signature in presence of two witnesses.

WILLIAM G. KETCHUM.

Witnesses:
C. C. GRIGSON,
J. P. ELLIS.